April 30, 1935.  S. G. MYERS ET AL  1,999,368
FIRE CONTROL COMPUTER
Filed Jan. 23, 1932   3 Sheets-Sheet 3
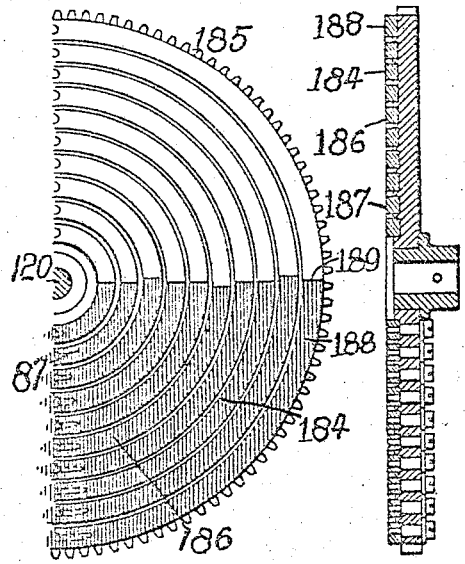
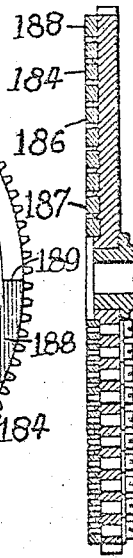
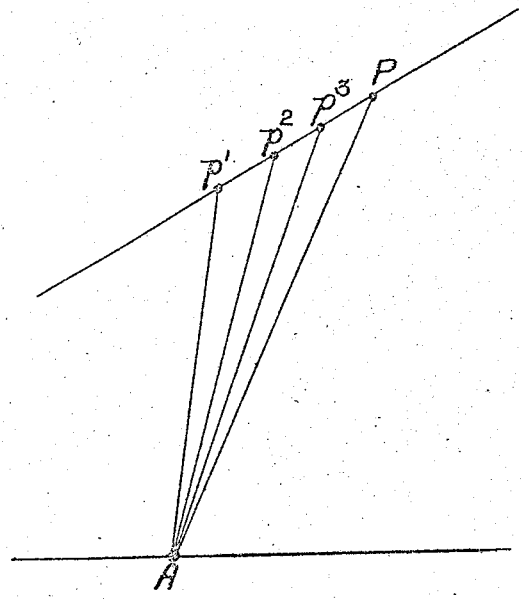
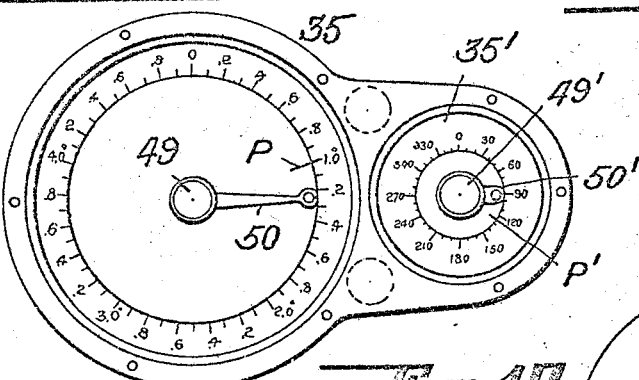
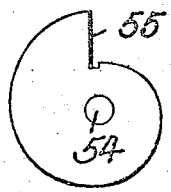
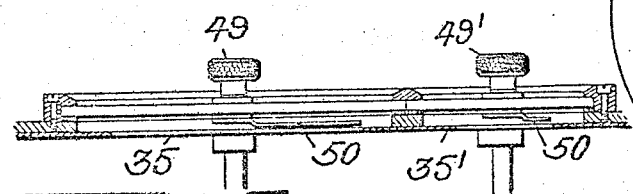
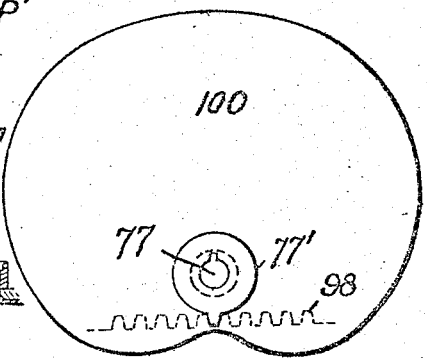
SHIERFIELD G. MYERS
EARL W. CHAFEE
BY Herbert H. Thompson
his ATTORNEY.

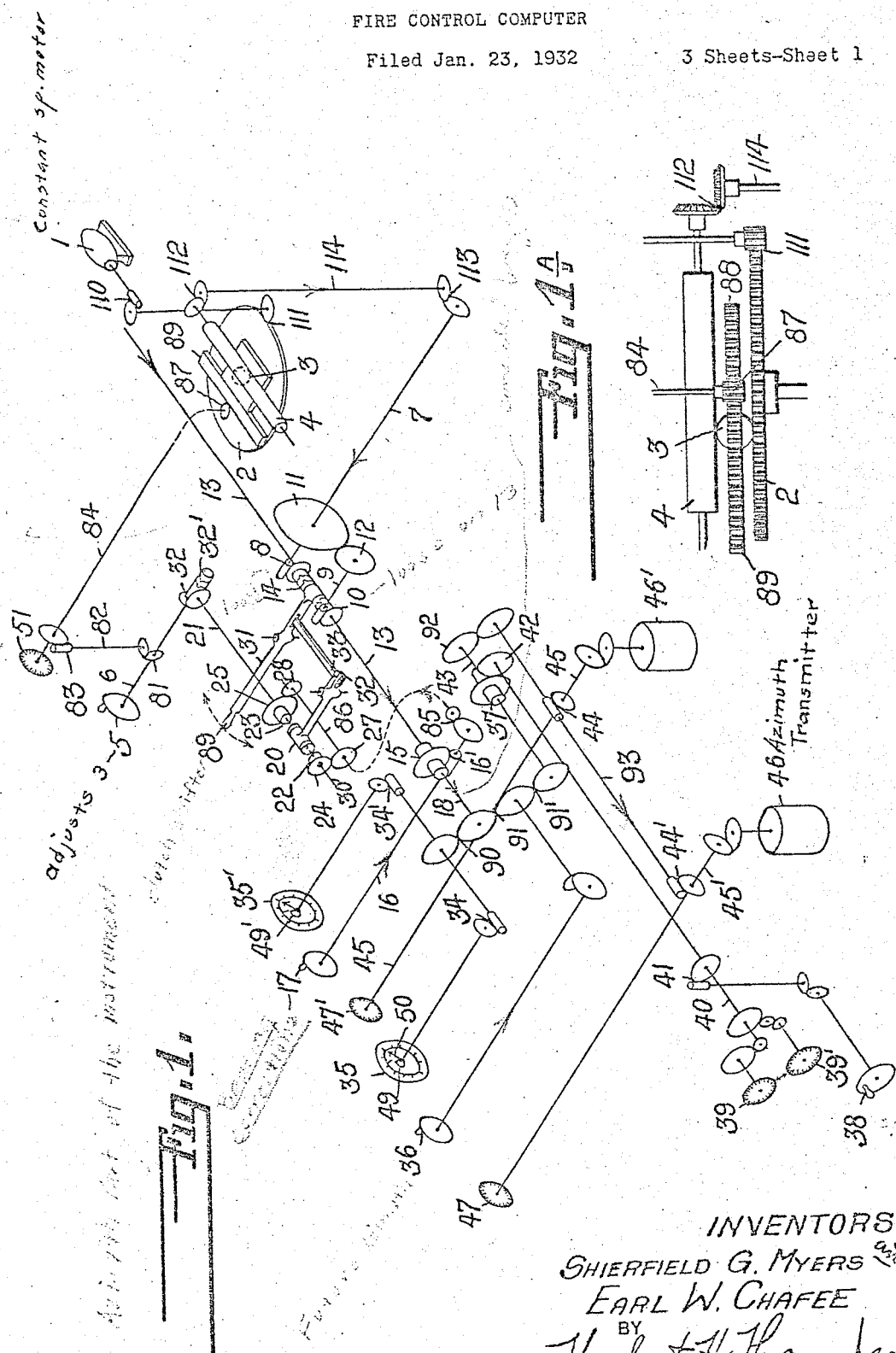

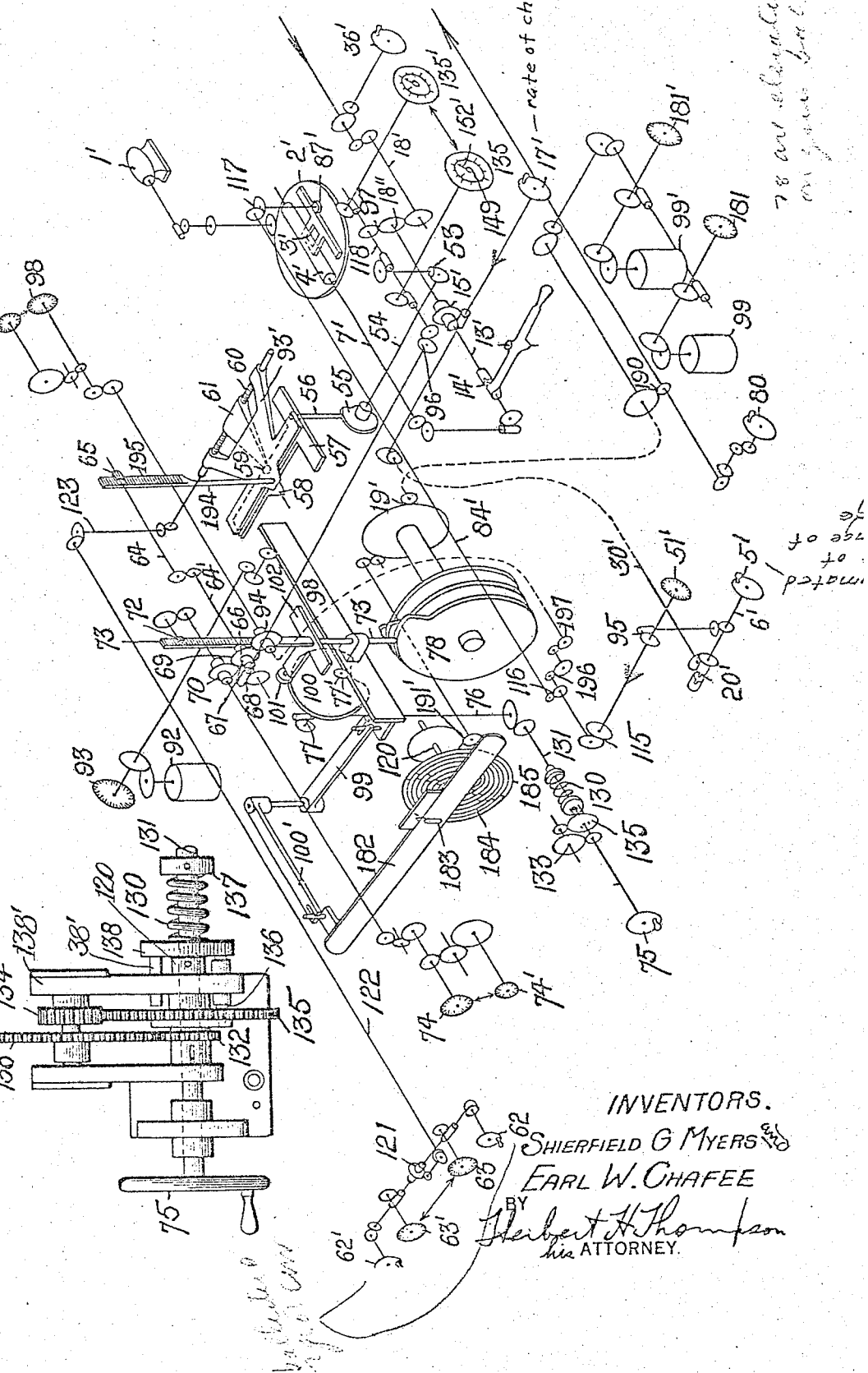

Patented Apr. 30, 1935

1,999,368

UNITED STATES PATENT OFFICE 1,999,368

FIRE CONTROL COMPUTER

Shierfield G. Myers, Freeport, and Earl W. Chafee, Brooklyn, N. Y., assignors to Sperry Gyroscope Company, Inc., Brooklyn, N. Y., a corporation of New York Application January 23, 1932, Serial No. 588,472

7 Claims. (Cl. 235—61.5)

This invention relates to range and bearing computers for assisting in the aiming of long range ordnance. Many very complicated and expensive computing devices have been proposed, known generally as range and bearing keepers which attempt to generate the range and bearing continuously from angles put into the instrument directly from the sighting telescope and range finders. By our invention we obtain equally as good or better results with a greatly simplified mechanism by devising an instrument into which it set range and bearing data taken from the plotting board and which is adapted to transmit continuously the corrected azimuth and elevation.

Referring to the drawings showing several forms of the invention,

Fig. 1 shows in schematic form the azimuth part of our instrument.

Fig. 1—A detail of the variable speed drive.

Fig. 2 shows in similar form the range and elevation portion of our instrument.

Fig. 3 is a detail of one of the setting mechanisms employed in Fig. 2.

Fig. 4 is a plan view of a portion of the zone of fire indicating disc.

Fig. 5 is a transverse section of the same.

Fig. 6 is a diagram illustrating the mathematical principles involved in a portion of Fig. 2.

Fig. 7 is a plan view of certain representative indicating dials.

Fig. 8 is a sectional view of the same.

Fig. 9 is a detail of the percent range cam employed in Fig. 2.

Fig. 10 is a detail of the cam employed to shift the range-elevation cam pin from cam to cam.

The purpose of the instrument shown in Fig. 1 is to establish a flow of uncorrected azimuth (future or predicted target bearings) that is in agreement with that read at regular time intervals, say every thirty seconds, from the plotting board and to transmit this azimuth plus the correction in azimuth as corrected azimuth or future target bearings to the bearing indicator at the guns. For this purpose there is provided a clock-regulated constant speed motor 1 that continuously rotates a disc 2 through suitable gearing 110 and 111. On said disc bears a variable speed ball 3 which bears at its other side on a cylinder 4. It will readily be seen that as the ball 3 is moved toward and away from the center of rotation of the disc 2 that the speed of rotation transmitted to the cylinder 4 will vary from a maximum in one direction through zero to a maximum in the other direction. The setting of the ball is controlled from a handwheel 5 on a shaft 6 which drives through gearing 81, stub shaft 82, worm gears 83 and shaft 84, said shaft having a pinion 87 thereon. Said pinion meshes with rack teeth 88 on a sliding carriage 89 which carries the ball 3 so as to adjust the ball laterally at will (see Fig. 1—A). Turning of the handwheel 5 also positions the dial 51 on shaft 84, the dial being set to show at this stage the estimated rate of change of azimuth or bearing.

The resulting rotation of the cylinder 4 rotates through suitable gearing 112—113 and cross shaft 114 the worm shaft 7 and worm and wormwheel 8. It also rotates at a (lesser) speed the worm shaft 9 and wormwheel 10 through change speed gears 11—12. Both wormwheels are loosely mounted on the main shaft 13 but clutch member 14 is splined thereto so that by throwing the clutch member into engagement with the clutch face of one or the other of the wormwheels, shaft 13 may be driven at two different speeds from the cylinder 4. This or an equivalent arrangement is for the purpose of increasing the effective range of variation of speed without unduly lengthening the roller 4.

The output of shaft 13 is led into a differential gear train 15, the planetary arm of which is rotated from the worm 16' and shaft 16 of the handwheel 17. The other arm of the gear train is connected to the output shaft 18. The function of the handwheel 17 is to introduce the bearing corrections to the rates of change as well as the indications as the machine is in operation and without interfering with the original settings. For this purpose the movements of the handwheel 17 are also carried back to the shaft 6 through gears 85 and shaft 86, but since a change speed gear is employed in the primary transmission we prefer to also employ a change speed clutch arrangement 20 between the shafts 16 and 6. As shown, there is splined on the shaft 21 a clutch member 20 which may be brought into engagement with one or the other of the clutch faces 22—23, secured respectively to gears 24 and 25. Said gears are of different diameter and are connected together through complementary gears 27—28 on shaft 86. It will readily be seen, therefore, that by moving the clutch member 20 in engagement with one or the other of clutch faces 22—23 that the shaft 30 may be driven at two different speeds. Preferably the controlling arms 31 and 32 of the two clutch members are tied together as by rod 33 so that the throwing of one clutch by handle 89 automatically throws the other clutch. Shaft 21 is coupled to the shaft 6 through any suitable means, such as bevel gears 32 and throw-out clutch 32', so that the dial 51 shows the predicted rate of change of range.

In operation the handwheel 17 is set every 30 seconds at the ring of a bell in accordance with the bearing read from the plotting board so that continuous bearing changes are being fed into the instrument. This uncorrected bearing is transmitted through the shaft 18, gears 90 and worm and wormwheels 34—34' to the coarse and fine dials 35—35'. To assist the operator there may be superimposed on the dials 35 and 35' setting knobs 49, 49' pivoted on the glass cover and each connected to an auxiliary pointer 50, 50' (see Fig. 7). The auxiliary pointers may be set to the new plotting board reading and if the bearing indices P and P' on the dials 35, 35' do not match the set pointers at the time the bell rings, the handwheel 17 is quickly turned to bring the two pointers and indices into coincidence. This operation not only changes the transmitted bearing but at the same time applies a correction to the rate through the shafts 21 and 86 as explained. When first starting the instrument, however, another handle 36 is set for the estimated uncorrected future azimuth AP as read from the plotting board thus turning the shaft 18. This is selected by the plotter as the point P on the board where the shell will strike the target, points $p_1$, $p_2$ and $p_3$ being plotted points of present position (Fig. 6).

The output of shaft 18, which, therefore, represents corrected bearings is led through gearing 91, 91' to another differential 37, the opposite arm of which is set from a handle 38 in accordance with the indicated corrections in azimuth, such as the ballistic and spotting corrections. These corrections are set up on the coarse and fine dials 39, 39' and are fed into differential 37 through the gears 41, shaft 40 and gears 42. The output of the differential is connected to the shaft 43 which turns through gearing 92, worm shaft 93 having thereon worms 44, 44', and shafts 45 and 45' to which are connected the coarse and fine target bearing or azimuth transmitters 46, 46' and also the corrected azimuth indicating dials 47, 47'.

In operating this portion of our invention the two clutches 14 and 20 are first left open and the variable speed motor started. The approximate rate of change of bearing is then set up on the dial 51 through the handwheel 5, thus setting the position of the roller on the cylinder. Next, the handwheel 36 is turned to set in the uncorrected azimuth on dials 35, 35' as indicated as the true estimated bearings on the plotting board. The selector clutch 14 is then thrown in to either fast or slow speeds thus throwing in the clutch 20 at the same time. The flow of azimuth data to the guns is now started, the data being based on the azimuth setting and the approximate rate of change. The instrument is operated in connection with a bell which rings periodically, say every 30 seconds, and before the second bell rings after the instrument starts the operator should observe whether the dials 35 and 35' indicate the correct azimuth. If not, handle 17 is turned until the pointer 50 on the dials match the indices.

This operation is repeated every thirty seconds on the ring of the bell, thus keeping the device at the proper rate. The azimuth correction for ballistic and spotting is also set in through the handle 38 and dials 39, the same being added to the uncorrected azimuth and the final result being transmitted through the transmitters 46, 46' and also shown on dials 47, 47'.

The range or elevation computing portion of the instrument is shown diagrammatically in Fig. 2. The initial settings are quite similar to the azimuth settings. Thus there is again provided a constant speed motor 1' for driving a variable speed shaft 7' of roller 4', the variable speed roller 3' being set from the handle 5' as before through gearing 95, 115, 116, shaft 84', gearing 117 and pinion 87'. Said handle is rotated to set the indicator 51' to the estimated rate of change of range in yards per unit of time (say 30 seconds). Shaft 7', when the clutch 14' is in, rotates the shaft 13'. This shaft, as before, rotates one arm of a differential 15', another arm being set from the handwheel 17' through which rate of change of range corrections are introduced. Handle 17' as before has a follow-back connection through clutch 20' and shaft 39' to the shaft 6' of the handwheel 5' to change the rate as well as the indicated range. In this instance, however, no two speed arrangement is shown in connection with the variable speed mechanism. It will be understood that the handwheel 17' is rotated to set the follow-the-pointed dials 135 and 135' to agree with the pointers 152' thereon, the latter being set every 30 seconds on the ring of the bell as before in accordance with the plotting board range readings. The original future range may be set in by the handwheel 36'. Output shaft 18" and, therefore, shafts 18' and 118 geared thereto are rotated in accordance with the rate of change of range in yards per unit of time plus the original range setting.

The shaft 118 is shown as rotating through a bevel gear drive 53 the shaft 54, on which is a cam 55 which we term "the per cent range correction cam", (see also Fig. 9). The position of this cam, therefore, is primarily a function of the total range and the cam is preferably laid out so that its maximum lift is a predetermined percentage of the range, say 15%, representing a maximum correction in range of that amount. Said cam lifts a pin 56 thereon which bears at its outer end against a T-shaped lever 57 pivoted at 58. On said lever in turn bears a second lift pin 59 which is adjustable along the lever. It will be evident, therefore, that the lift of pin 59 may be varied from zero when at the pivot 58 of the lever 57 to a maximum in either direction equal to the lift of the pin 56 as the pin 59 is shifted across said pivotal point 58 and toward either end. In between, its lift is directly proportional to the distance from the pivot 58. The pin 59 is shown as positioned along the lever to the proper per cent range correction positioned by a threaded shaft 60 threaded through a triangular-shaped plate 61 and rotated from either or both of handwheels 62, 62'. Said handwheels are rotated to position the dials 63, 63' in accordance with the indicated spot and ballistic per cent corrections (respectively) in range as received, each correction being put in independently but added by differential 121 and transmitted through shafts 122 and 123.

The resulting lift of the pin 59 lifts a second triangular plate 93' pivoted on shaft 60, which in turn lifts rod 194. Said rod in turn rotates shaft 64 through rack teeth 195 on the under surface of the pin meshing with the pinion 65 on said shaft. Shaft 64 turns a second shaft 64', which turns one arm of a differential gear 66, the opposite arm 67 being turned from shaft 18", representing the plotting board uncorrected range, through worm and wormwheel gearing 68, bevel gears 96 and spur gears 97. The planetary arm 69 of said train is turned in accordance with the algebraic sum of the uncorrected range and the correction and, therefore, represents corrected range. Arm 69 rotates one arm of the differential gear 70. Another arm of said gear train is turned from the pinion 72 which is rotated from a lift rod 73, while the third arm of said train turns zero reading dials 74, 74'. The duty of the operator of the crank 80 is to keep the dials 74, 74' at zero thus providing in effect a manually operated follow-up system. Crank 75 is shown as secured to a shaft 131 which is both slidably and rotatably mounted. To said shaft is secured a collar 120 so that when said crank is pushed inwardly it carries with it a disc 138 loosely mounted on said shaft and spring pressed against said collar by spring 130 which bears at its rear end against a second fixed collar 137. Said disc is normally prevented from rotating by pin 38', which engages a hole in fixed bracket 138'. Said disc also carries a pin 136. In the position shown in Fig. 3 said pin engages a hole in the face of gear 135 to lock the same in a predetermined position. There is also slidably but non-rotatably secured to shaft 131 the hub of pinion 132, which meshes with large gear 133, to the shaft of which is secured a pinion 134, the latter meshing with the aforesaid gear 135. It will readily be seen, therefore, that shaft 131 cannot be rotated as long as pin 136 engages the hole in gear 135, but that by pushing in on the handle 75, pin 136 is released so that shaft 131 may be revolved through several revolutions until the pin 136 again drops into the hole.

Shaft 131 rotates through shaft 76 the shaft 77 of a single tooth pinion 77' (see also Fig. 10) which engages a rack bar 98 carrying the rod 73. The gear train 132 to 135 is so designed that only one revolution of the shaft 77 is permitted at a time, thus rotating single toothed pinion 77' through one revolution and likewise rotating the lift cam 100 through one revolution. The toothed pinion positions the rod 73 on one or the other of a succession of range elevation cams 78. These cams are designed in accordance with the relations between range and elevation of the various type of guns, shells and powder charges employed, the proper cam being selected for particular conditions of firing at the moment. The range elevation cams 78 are rotated to the values of gun elevation with lifts equal to the range of that elevation. Said cams are rotated from handle 80, through gearing 190 and 191, the amount of elevation being shown on the dials 181, 181'. As each shift is made from one cam to another, the rod 73 is temporarily lifted by cam 100 on shaft 77 which lifts roller 101 on T-shaped piece 102 secured to rod 73. By the operation of the handwheel 75 the range elevation cam pin 73 is shifted to the selected zone cam.

It is, of course, also true that the maximum range of a gun is reached at approximately 45° elevation so that all intermediate ranges may be obtained either by a greater or less elevation than 45° known generally as high and low angle firing. Also coupled with bar 98 as by bell crank levers 99 and 199' is a bar 182 which is thus shifted longitudinally on rotation of the shaft 77. Said plate has a slot 183 therein through which appears one of the bands or rings 184 on the low and high angle indicating disc 185 so that the said disc will show the zone of fire. Disc 185 is mounted on shaft 120 and preferably consists of a plurality of concentric rings 184, 186, 187 and 188, etc., one for each of the zones. Each ring is adjustably mounted upon said disc, the disc itself being rotated from the handwheel 80 through gearing 190 and 191, 191'. Only that portion of one of the rings is visible to the operator which is seen through the opening 183 in the shutter 182. One half of each ring may be white for low angle fire, for instance, and the other half red for high angle fire. Each ring is made adjustable with respect to the disc so that the dividing line 189 between the two colors can be set in agreement with the point in its range elevation cam which represents maximum range, this varying from 45° with the particular type of gun, etc. employed.

The operator of the handwheels 75 and 80 must not only keep dials 74, 74' reading zero but he must also keep the proper color or zone indication visible on the indicator 185 to correspond to whether low or high angle fire is employed. In thus rotating the dials 74, 74' the operator of handwheel 80 rotates the elevation cams so that the cam selected by the operation of the handwheel 75 lifts the pin 73 thus rotating the pinion 72 until the pointer 74 again reads zero. The angle through which the cam 78 is rotated, therefore, represents the elevation correction which is transmitted through the coarse and fine transmitters 99, 99' to the gun and which is also shown on dials 181 and 181'. At 92 is shown a zone transmitter, the zone being shown also on dial 93.

In order that the plotting room operator may know what the future corrected range is to be at a selected point P, an additional differential 94 is provided, one side of which is rotated from the gear 69' as corrected range plus the spotters and ballistic correction (per cent range correction). Into the other side is fed the rate of change range from the shaft 6' through gears 95, 115, 196 and 197. The output side of the differential is connected to the dials 98, 98' which, therefore, shows the algebraic sum of $R_p$ (corrected range)

$k \times R_p$ (percent range correction)

$dR$ (rate of change of range per unit of time)

If the point P is selected at 30 seconds ahead, i. e., at an integral equal to the unit of time employed (or at some known factor thereof), the dial 98 will show future or predicted corrected range factor from which the future range at the time the shell hits the target may be plotted on the board.

In using the range indicating portion of our invention, the operator first places the two clutches 14' and 20' in the off position and starts the variable speed drive 1', 4'. The estimated rate of change of range is then set in the instrument on the dial 51' by turning the handwheel 5'. The uncorrected initial range is then set into the instrument on dials 135 and 135' by turning the handwheel 36'. The clutches 14' and 20' are then thrown in at the ring of the 30 second bell which starts the flow of uncorrected range data. The operator then sets the next reading of uncorrected range on the instrument through the knobs 149 on dials 135, 135'. On the ring of the next 30 second bell, the handle 17' is quickly turned to match the pointers on the dials 135, 135' which corrects the value of range and at the same time applies a correction to the rate of change of range through the follow-back connection 30' as in the azimuth gearing. This operation is repeated every 30 seconds so that the correct flow of range rates is maintained. Also there is set up on the dial 63, 63' through the handwheels 62, 62' ballistic and spot corrections in per cent range. Dials 74, 74' are at the same time kept at zero by the rotation of handwheel 17', the operator being instructed beforehand whether to use high or low angle fire and also which zone to employ, these settings being controlled from the handwheels 29 and 75 respectively.

In accordance with the provisions of the patent statutes, we have herein described the principle and operation of our invention, together with the apparatus which we now consider to represent the best embodiment thereof, but we desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having described our invention, what we claim and desired to secure by Letters Patent is:

1. In a fire control computer, means for setting up therein original range, a variable speed device means for setting the same in accordance with the estimated rate of change of range, range indicating means actuated by the combined output of said first means and said device, means for periodically correcting the range in accordance with periodically received range data, means actuated thereby for changing the aforesaid rate, and means for introducing the spotters and ballistic corrections as percent range corrections whereby predicted range may be indicated.

2. In a fire control computer, means for setting up therein original range and estimated rate of change of range, means for correcting the range periodically, means actuated thereby for changing the aforesaid rate, and means for introducing the spotters and ballistic corrections as a percent range correction and means for converting the final corrected range into an elevation angle corresponding to either high or low angle fire.

3. In a fire control computer, means for setting up therein original range and estimated rate of change of range, means for correcting the range periodically, means actuated thereby for changing the aforesaid rate, means for introducing the spotters and ballistic corrections as a percent range correction, and means for adding the corrected range and the spotters and ballistic corrections to the change of range for a predetermined future interval to give the plotting board operator future range so that the target's location may be predicted at the time the shell strikes the target.

4. In a fire control computer, means for setting up therein original target bearings, a variable speed device, means for setting the same in accordance with the estimated rate of change of bearing, bearing indicating means actuated by the combined output of said first means and said device means for periodically correcting the bearing in accordance with periodically received bearing data, means actuated thereby for changing the aforesaid rate, means for introducing spotters and ballistic corrections as percent range corrections, and means for adding the corrected bearings and spotters and ballistic corrections to the change of range for a predetermined future interval to give the plotting board operator future bearings so that the target bearing angle may be predicted at the time the shell strikes the target.

5. In a fire control computer, means for setting up therein original range and estimated rate of change of range, means for correcting the range periodically, means actuated thereby for changing the aforesaid rate whereby predicted range may be indicated, a plurality of range elevation cams for different types of shells, actuated from the indicated predicted range, a common output pin for all of said cams, means for placing said pin on any selected cam including means for raising the pin when changing from one cam to another, and means operated by said positioning means for indicating which cam is operating.

6. In a fire control computer, means for setting up therein original range and estimated rate of change of range, means for correcting the range periodically, means actuated thereby for changing the aforesaid rate whereby predicated range may be indicated, a plurality of range elevation cams for different types of shells actuated from the indicated predicted range, a common output pin for all of said cams, and means for placing said pin on any selected cam including means for raising the pin when changing from one cam to another.

7. In a fire control computer, manual means for setting up therein continuously changing bearings from telephoned bearing data given at constant, recurring intervals, comprising settable means for setting in the initial angle, a variable speed mechanism, additional settable means for setting in each new angle as it is received, means for indicating the rate of change of bearing therefrom, and means settable in accordance with said rate for adjusting said variable speed mechanism, whereby continuously correct bearings are fed into the computer.

SHIERFIELD G. MYERS.
EARL W. CHAFEE.